United States Patent [19]

Clark et al.

[11] Patent Number: 4,521,792

[45] Date of Patent: Jun. 4, 1985

[54] ION PROJECTION PRINTER WITH CHARGE COMPENSATION SOURCE

[75] Inventors: Lloyd D. Clark, San Francisco; Jean K. Wilcox, El Granada; Gene F. Day, Cupertino, all of Calif.

[73] Assignee: Xerox Corporation, Stamford, Conn.

[21] Appl. No.: 527,705

[22] Filed: Aug. 29, 1983

[51] Int. Cl.$^3$ .............................................. G01D 15/06

[52] U.S. Cl. ..................................................... 346/159

[58] Field of Search ..................... 346/153.1, 159, 155; 360/229, 230

[56] References Cited

U.S. PATENT DOCUMENTS

| | | | |
|---|---|---|---|
| 2,483,462 | 10/1949 | Huebner | 346/159 X |
| 3,623,123 | 11/1971 | Jvirblis | 346/159 |
| 4,365,549 | 12/1982 | Fotland et al. | 346/159 X |

FOREIGN PATENT DOCUMENTS 55-55353 4/1980 Japan .

*Primary Examiner*—Thomas H. Tarcza
*Attorney, Agent, or Firm*—Serge Abend

[57] ABSTRACT

An improved ion projection printing apparatus, for imaging on the front surface of a charge receptor sheet with an imagewise charging device and for depositing a counter-charge upon the rear surface of the charge receptor sheet with another charging device located downstream of the imagewise charging device.

7 Claims, 8 Drawing Figures

PRIOR ART

ION PROJECTION PRINTER WITH CHARGE COMPENSATION SOURCE

This invention relates to an improved ion projection printing apparatus, for imaging on the front surface of a charge receptor sheet with an imagewise charging station and for depositing a counter-charge directly upon the rear surface of the charge receptor sheet, at a location downstream of the imaging station, with another charging device.

In a copending U.S. Pat. No. 4,463,363, assigned to the same assignee as the present application entitled "Fluid Jet Assisted Ion Projection System" (Gundlach et al), fully incorporated herein, there is described a high resolution, low cost, ion projection printing system. The application relates to a unique device for the generation of ions of one sign and their subsequent selective deposition, in an image configuration, onto a charge receptor. A jet of transport fluid traverses a channel, passing through the ion generating device, and sweeps the ions past a modulating device for delivering ion "beams" onto a charge receptor sheet, which may be ordinary paper. The paper sheet is held adjacent an electrically biased back electrode, which establishes a strong electric field for accelerating the ions toward the sheet and for focussing the ions thereon. As imaging ions are deposited upon the sheet, a counter-change is induced in the back electrode for establishing a balanced system. Downstream of the ion projection station, at a developing station, the image charge pattern may be rendered visible by toner particles which are attracted to the surface charge on the sheet and are subsequently fixed to the receptor sheet at a fusing station. Neither the developing nor fusing stations are features of the copending application.

In U.S. Pat. No. 3,714,665 (Mutschler et al) entitled "Electrostatic Recording With Improved Electrostatic Charge Retention" there is taught a printing apparatus for recording upon ordinary paper. A charging station, shown schematically by an arrow, which may take the form of any suitable means, is provided for depositing an electrostatic charge pattern upon the paper. A conductive back electrode is positioned in contact with the opposite side of the paper and extends from the charging zone through a development zone, at which location the charge pattern is made visible.

In Japanese Pat. No. 55-55353 (Uchimura) entitled "Electrostatic Printing Device", images are formed on ordinary paper. The described apparatus includes a corona wire ion generator and a modulation structure comprised of two, spaced, conductive, apertured plates. By adjusting the potential difference between the apertured plates, ions are allowed to pass through the apertures or are inhibited from passing. Those ions passing through the modulation structure are then attracted to and accelerated by a back electrode and deposit upon the paper, interposed between the ion source and the back electrode. A development station and fusing station are also incorporated in the printing device. It is the intent of the patented invention to prevent damaging the electrostatic image pattern by eliminating the discharge between the paper and the back electrode prior to development of the image. To this end, the same solution taught in Mutschler et al (described above) is set forth, namely, extending the back electrode through the development station.

It has been found that the back electrode structures taught by Uchimura and by Mutschler et al, if utilized with an ion projection image input device of the type taught by Gundlach et al, are each inadequate to achieve good image quality. While they satisfactorily preserve the latent image prior to development, they do not address the problem of toned image disruption. Thus, as the paper with the toned image thereon separated from the back electrode, before the image is fused, image disruption is likely to occur. The disruption has been observed to take place when the distance between the paper and the back electrode increases to the extent that charge transfer between the back electrode and the back surface of the paper takes place as the Paschen breakdown voltage is exceeded.

Therefore it is the primary object of the present invention to provide an ion printing apparatus in which toner image disruption, of the unfused toner particles, is eliminated.

In a copending patent application bearing U.S. Ser. No. 505,641 filed June 20, 1983, assigned to the same assignee as this application, entitled "Ion Projection Printer With Extended Back Electrode" (Wilcox et al) there is taught the use of a continuous back electrode, extending from the ion projection region through the fusing region, for eliminating toner image disruption of the unfused toner particles on the receptor sheet.

In another copending patent application bearing U.S. Ser. No. 505,645 filed June 20, 1983, assigned to the same assignee as this application, entitled "Ion Projection Printer With Pseudo-Continuous Back Electrode" (Day) there is taught an improvement on the Wilcox et al invention whereby the back electrode may be modified to introduce one or more thermal barrier air gaps between the fuser and the image formation and development regions in order to reduce the flow of heat, through the extended back electrode, from the fusing region back to the image formation and development regions.

The approach followed in the preceding copending applications is to prevent toner image disruption by maintaining the image charge and its counter-charge, in the back electrode, close together through the fusing step.

This invention seeks to prevent image disruption by establishing a charge balanced condition across the sheet itself. It may be carried out, in one form, by providing an ion printing system capable of placing electrostatic charges, in image configuration, upon a relatively moving charge receptor, such as a length of ordinary paper. The system includes an ion projection device, a development device, a fusing device and a charge compensating ion deposition source, positioned adjacent the rear surface of the image receptor, downstream of the ion projection device. The charge compensating source serves to provide an adequate supply of oppositely charged ions to the receptor.

A related invention is described in a copending patent application Ser. No. 527,712, filed Aug. 29, 1983, entitled "Ion Projection Printer With Virtual Back Electrode" (Day). In that application there is disclosed an ion deposition source for depositing a counter-charge directly upon the rear surface of the charge receptor sheet, in the ion deposition region, simultaneously with the deposition of the imaging charge.

Other objects and further features and advantages of this invention will be apparent from the following description considered together with the accompanying drawings wherein.

Figure 4:
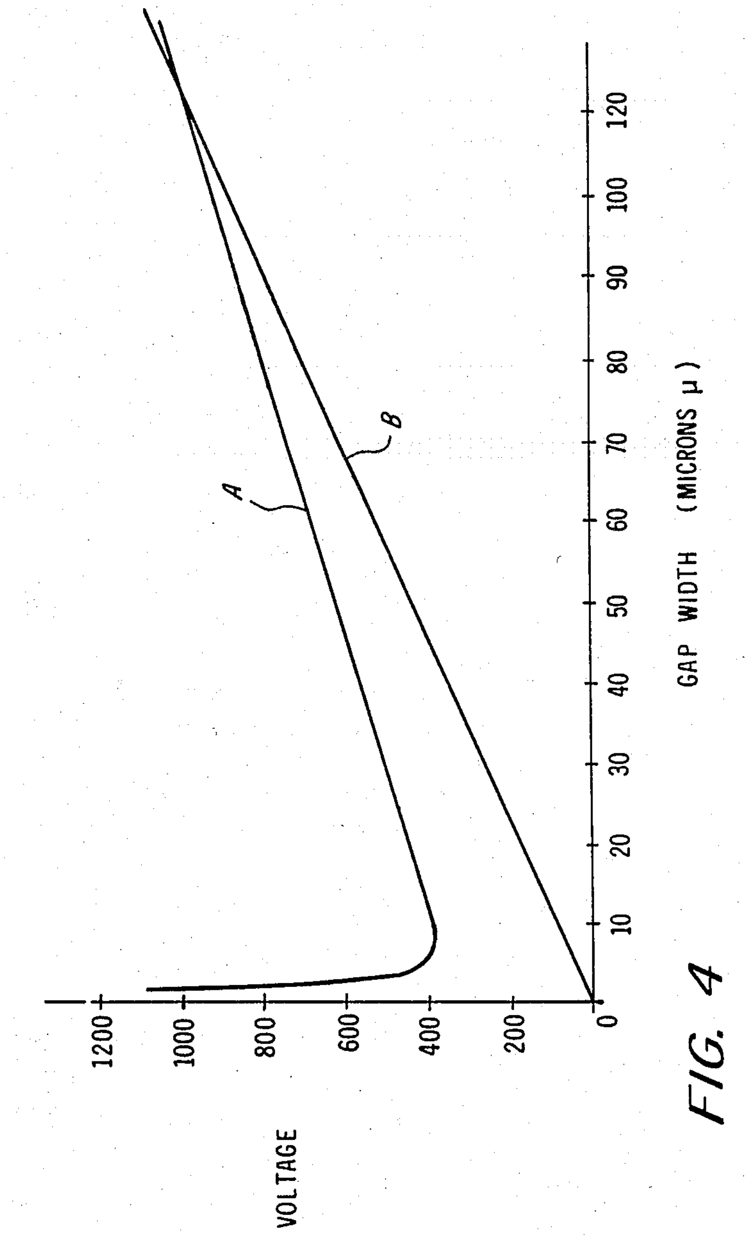
Figure 5:
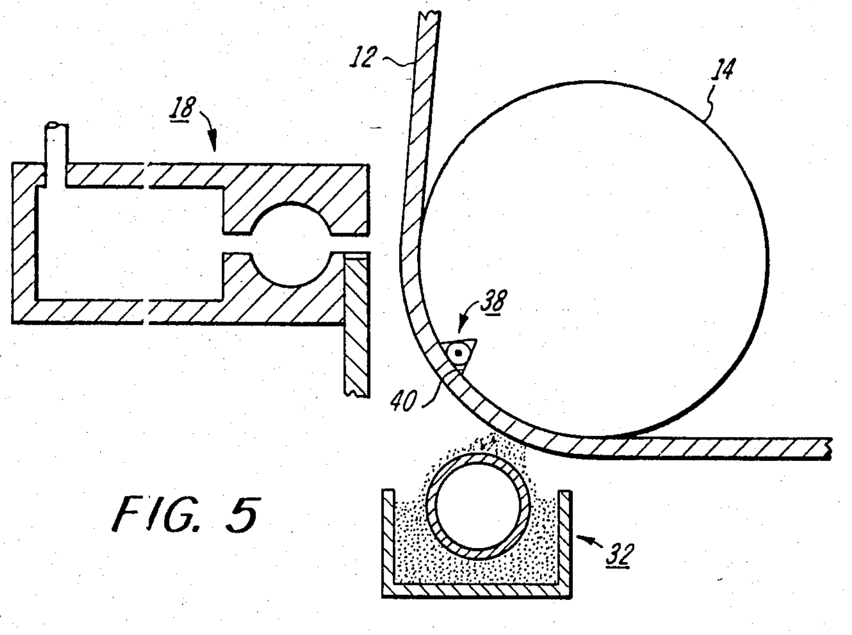
Figure 6:
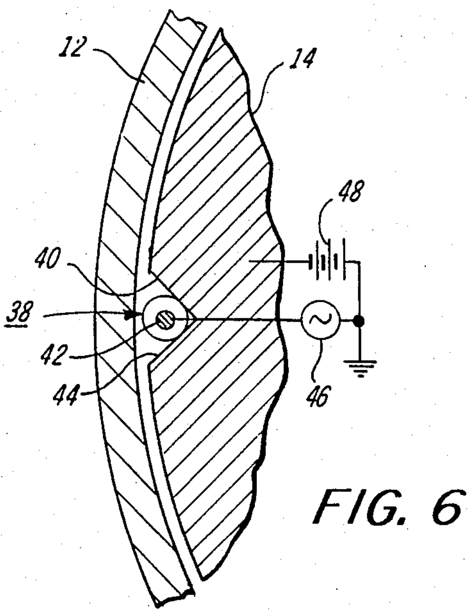
Figure 7:
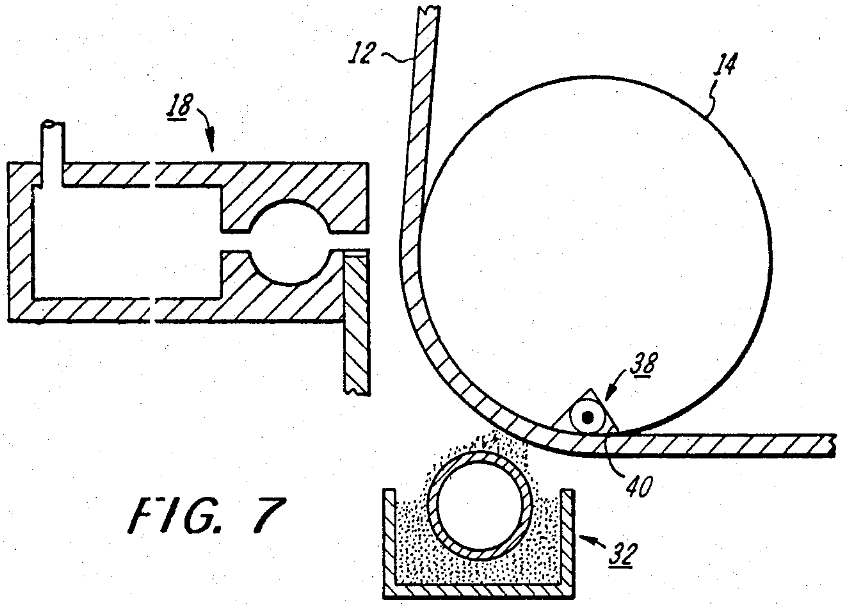
Figure 8:
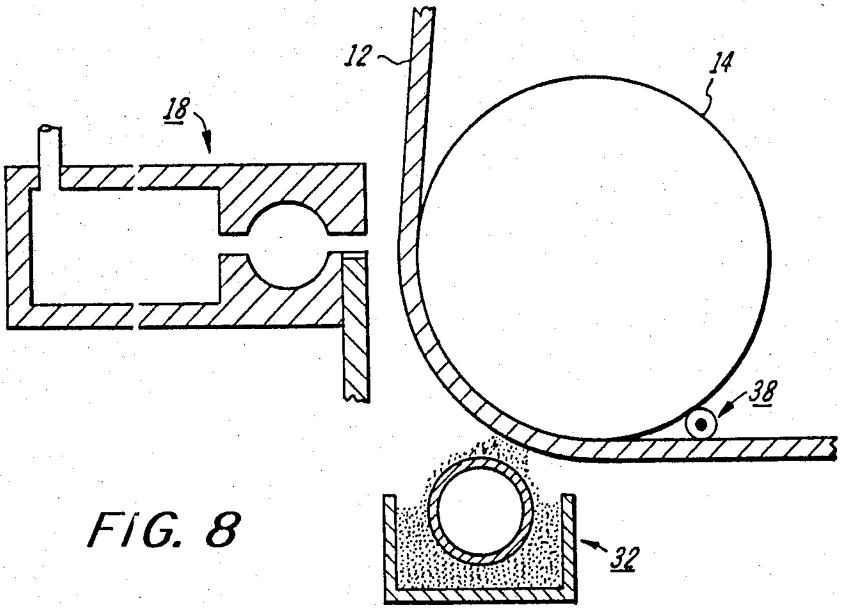

FIG. 4 is a graph showing the Paschen curve for air breakdown together with electric field plots for charge values normally applied to the image receptor paper, FIG. 5 is a side elevation view showing the charge compensating source positioned between the imaging and development regions, FIG. 6 is an enlarged sectional view showing the charge compensating source, of the FIG. 5 embodiment, in greater detail, FIG. 7 is a side elevation view similar to that of FIG. 5, showing the charge compensating source positioned downstream of the development station, and FIG. 8 is a side elevation view similar to that of FIG. 5, showing the charge compensating source positioned at the point of separation between the charge receptor sheet and the back electrode.

Figure 1:
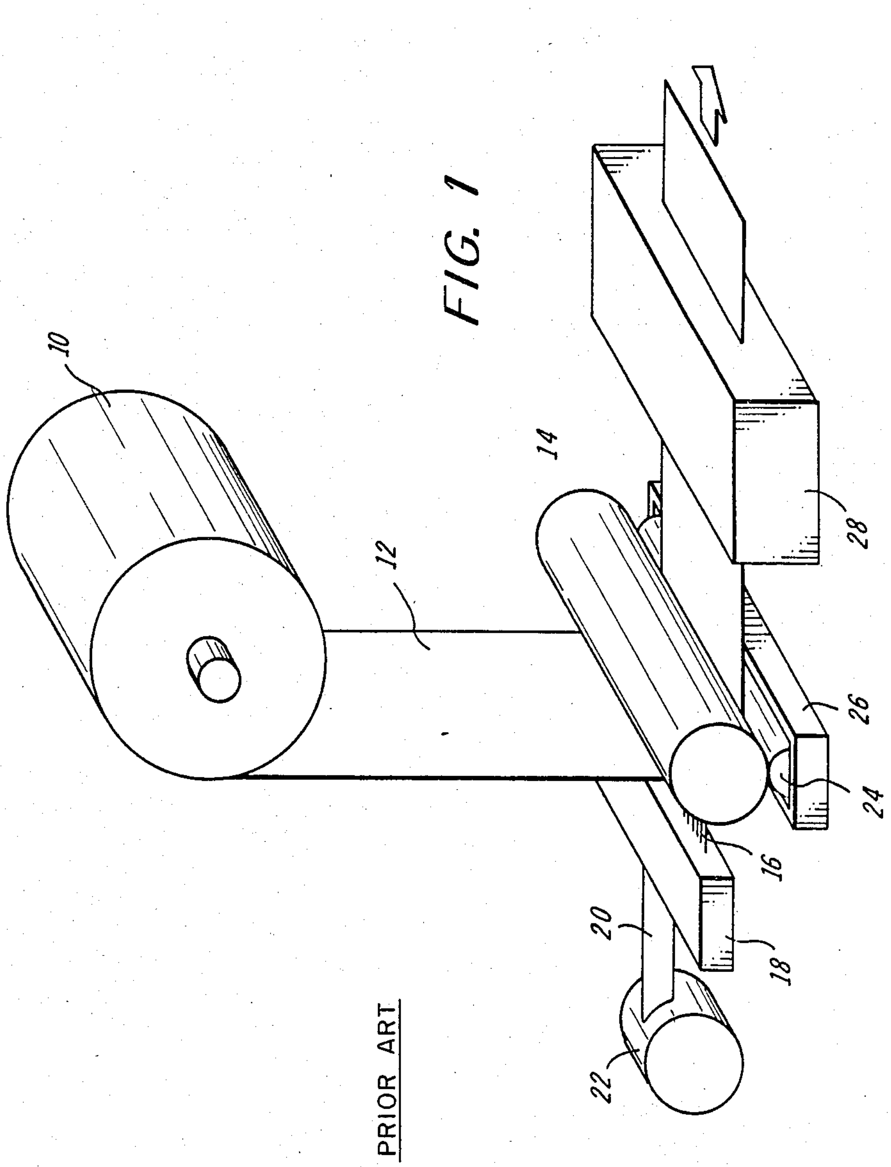
FIG. 1 PRIOR ART
FIG. 1 is a perspective view of an ion projection printing apparatus configured in accordance with the prior art teachings.

With particular reference to the drawings there is illustrated in FIG. 1 an ion projection printing system which does not incorporate the improvement of the present invention. It is presented to show the conditions which give rise to image disruption problems. A supply roll 10 of a suitable image receptor 12, preferably ordinary paper, delivers the receptor, in intimate contact with the surface of a conductive back electrode 14, to an image receiving zone. An image is formed thereon by the selective projection of beams of ions 16 from the generation and projection head 18. Ions of a desired sign (+ or −) are created within the head and are then transported therethrough by a transport fluid, such as air, delivered by duct 20 from a pump 22. As the ions exit the head, a suitable modulating electrode structure is addressed to allow selected ion beams to pass to the image receptor sheet and to cause other ion beams to be neutralized.

An example of one form of the ion generation and projection head 18 is set forth in U.S. Pat. No. 4,463,363 (Gundlach et al) more fully identified above. Another type of ion generation and projection head is disclosed in a copending U.S. patent application Ser. No. 471,380, filed Mar. 2, 1983, also assigned to the same assignee as the present application, entitled "Fluid Jet Assisted Ion Projection and Printing Apparatus" (Sheridon).

The latent image is made visible by the application of toner particles to the charge bearing areas of the paper. A typical development apparatus comprises magnetic brush roller 24 rotatable through a sump 26 of magnetic toner particles where it picks up the toner and brushes it over the paper surface. Toner material is selected to achieve a polarity opposite to the image charge so that it will have a preferential attraction for the charged image areas. Once the sheet has been developed it is transported past fuser 28 where the toner is caused to melt and to flow into the paper fibres forming an indelible print of the image.

Figure 2:
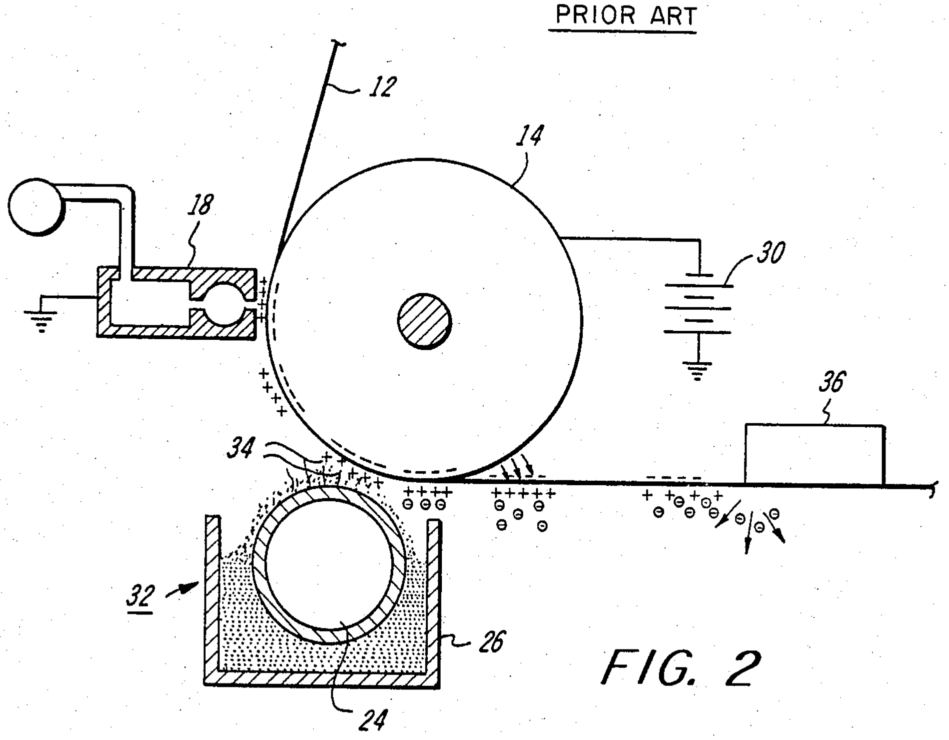
FIG. 2 is a partial side elevation view of the FIG. 1 apparatus showing the areas of image disruption.

In FIG. 2, there is illustrated in more detail, the problem areas encountered in the printing system of FIG. 1. Positive ions exit the ion generation and projection head 18 and deposit, in image configuration, on the front side of the paper 12. The ions are accelerated to the paper and focussed by a field, established between the conductive back electrode 14, connected to a high voltage bias source 30 (on the order of 1300 to 1400 volts DC), and the normally electrically grounded head 18. An image potential is created across the paper thickness by the induction of counter-charges, at the surface of the conductive back electrode, of a magnitude equal to and a sign opposite to the image charges. As illustrated, the image charges are positive (+) and the counter-charges are negative (−).

Then the paper passes the development station 32 where the image is made visible by a single component magnetic dry toner. Development station 32 comprises a sump or trough 26, within which toner is stored for application by means of a magnetic brush roller 24. At the development zone, adjacent the paper 12, tendrils 34 of linked magnetic toner particles are formed, extending between the roller 24 and the sheet. As these tendrils of toner particles sweep over the surface of the paper a negative charge is induced on the particles and some are attracted to the positive surface charges of the established dipoles and adhere to the paper. Next, the paper is stripped from the back electrode and is drawn past the platen fuser 36 where the toner is heated to its melting point and flows into the paper fibres.

Figure 3:
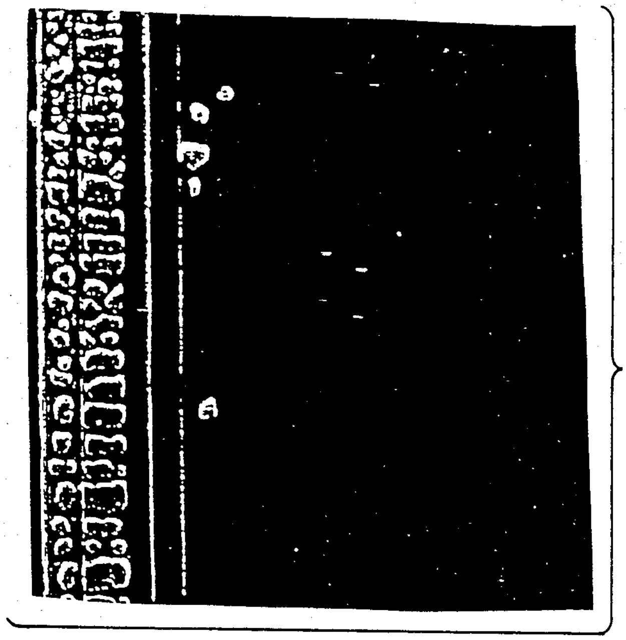
FIG. 3 is a sample of the distorted image of a solidly toned area.

In order to achieve good image quality, it is necessary to maintain intimate contact between the back electrode 14 and the paper 12 through the fusing step. However, as the sheet passes from the development station 32 to the fuser 36 it is normally stripped away from the back electrode 14. As the distance of separation increases, the electric field increases, causing the Paschen breakdown voltage to be reached and disruptive charge transfer to occur. During this phenomenon, the negative charges in the back electrode, jump or spark across the gap, to the rear surface of the paper. This is illustrated in FIG. 2 by the wavy arrows in the nip. In areas where there is a high charge density, i.e. large solidly toned areas, as opposed to line images, toner explosions have been observed, leaving very low density spots in the image, as shown in FIG. 3. Although the mechanism of toner exploding off of the paper is not fully understood, it is believed that the phenomenon is the result of mutual repulsion of some of the same polarity toner particles taking place subsequent to the uneven distribution of positive charges on the back surface of the paper, caused by the disruptive charge transfer.

If the paper has been separated from the back electrode before the image is fused, an additional area of toner disruption is exhibited as the paper arrives at the leading edge of the electrically conductive heated fuser. The toner particles again repel one another, and can be visually observed to explode in a semi-spherical manner, away from the paper surface (note FIG. 2). A definitive explanation for the disruption is not presently available, however, it is believed that it may be related to the uneven distribution of positive charges on the back surface of the paper, caused by the disruptive charge transfer as the paper was stripped from the back electrode.

When two electrostatic charge bearing surfaces are separated by a gas film, transfer of electrostatic images from one surface to the other requires movement of the electrical charges through the gas. The phenomenon of electrical breakdown of an air gap (disruptive charge transfer) is explained by Paschen's law and may be graphically represented for air by curve A of FIG. 4. Looking at curve A from right to left, it can be seen that as the gap between charge bearing surfaces gets smaller the breakdown voltage decreases and arrives at a minimum of about 360 volts at about 7.5 microns. Thereafter, as the gap gets smaller yet, the breakdown voltage increases because, it is believed, avalanching or sparking becomes less probable in the 2 to 4 micron range.

Typically, the ion generation and projection head 18 of the type illustrated in FIG. 2 is capable of depositing ions having a charge density in the range of about 7 to 8 nanoCoulombs/$cm^2$. A charge density of that magnitude would yield an electric field of about 8 or 9 volts/micron (plotted as curve B in FIG. 4). Thus, as the paper 12 is separated from the back electrode 14 the electric field will increase linearly at the rate of 8 or 9 volts/micron. At a separation of about 125 microns (i.e. about 5 mils) the electric field plot (curve B) crosses the Paschen threshold plot (curve A) and disruptive breakdown will occur.

The foregoing discussion has centered on the problems caused by air breakdown as a charge carrying sheet is separated from its counter-charge in the back electrode. It has been found that if the counter-charge is placed directly upon the rear surface of the receptor sheet, rather than being induced in the conductive back electrode, a balanced condition will exist across the sheet itself and no image charge disruption can occur. To accomplish this result, there is illustrated in FIGS. 5 through 9, a number of variations, both in the configuration and the placement, of a charge compensating source.

The imaging process accomplished in the embodiment illustrated in FIGS. 5 and 6, takes place by selectively controlling the passage of ions through projection head 18 and upon the front surface of charge receptor sheet 12. The imaging ions are accelerated to the sheet and focussed thereon by the attractive force of the back electrode support member 14, which is connected to a potential source on the order of 1.3 to 1.5 kV D.C. During the imaging step, a counter-charge is induced in the back electrode, in the known manner, for balancing the image charge. At a location downstream of the imaging station, a charge compensating source 38 is introduced for depositing an ionic counter-charge directly upon the rear surface of the charge receptor sheet as a replacement for the induced counter-charge in the back electrode. Its sole purpose is to deposit an opposite charge on the rear surface of the receptor sheet of sufficient magnitude to largely compensate the image charge and to prevent Paschen breakdown and concomitant image disruption. Thus, the placement and magnitude of the charge compensating source is highly flexible since its sole purpose is to lower the remaining unbalanced state across the paper to a level where the electric field between the paper and the back electrode will not yield a breakdown voltage when the paper is stripped. Having done so, the toner image will remain intact upon stripping and upon reaching the fuser. No toner explosions will occur.

The charge compensating source 38 is in the form of a coated wire electrode located within an axially extending V-shaped groove 40 in the support member 14. It comprises a conductive wire electrode 42, such as tungsten, coated with a dielectric material 44, such as glass. Typically, the wire would be about 5 mils in diameter and the overall diameter of the coated wire electrode 38 would be about 9 mils. Other dielectric coatings may be used in place of glass, however, organic insulating materials are generally unsuitable for this application, as most such materials tend to degrade with time due to oxidizing products formed in atmospheric electrical discharges.

An alternating potential source 46 of about 2000 volts peak to peak, operating at a frequency generally in the range of one kHz to several MHz, is applied to the wire 42. The cylindrical support 14 is connected to a D.C. potential source 48, of desired collection voltage, which may be on the order of 1.3 to 1.5 kV.

In operation, a neutral plasma, consisting of ions of both signs, fills the groove 40. During the writing process, the receptor sheet, bearing an image charge on its front side, is moved along the cylindrical support/back electrode 14 and counter-charges in the back electrode move along with the image charges. As the sheet 12 departs from the surface of the conductive back electrode at the lead edge of the groove 40 there would normally be a tendency for air breakdown to occur. However, ions of the appropriate sign are attracted, out of the plasma, to the rear surface of the sheet, creating a charge balanced condition across the sheet. Now the sheet may be stripped off of the back electrode without concern for disrupting the image charge.

Since the image charge density is normally on the order of 7 or 8 nC/$cm^2$ it is generally not necessary to deposit more than about 5 nC/$cm^2$ to the rear surface of the receptor sheet. Having neutralized 5 nC/$cm^2$ across the sheet, the remaining 2 or 3 nC/$cm^2$ on the imaged surface of the receptor sheet would present no Paschen breakdown problem. Thus, it should be noted that although reference has been made to creating a charge balanced condition across the sheet, the approximately 70% neutralization is sufficient to establish a virtually balanced state.

As illustrated in FIGS. 7 and 8 the charge compensating source 38 may be advantageously placed at other locations. For example, in FIG. 7 the charge compensating source is positioned downstream of the development station 32. During development, as the oppositely charged marking particles are attracted to the image charge, there will be some neutralization of the image charge. Thus, a somewhat lesser compensating charge need be applied to the rear surface of the sheet than is necessary in the FIG. 5 embodiment. In FIG. 8 it is placed in the nip between the back electrode 14 and the sheet 12 at the point of stripping the sheet from the back electrode.

Although the charge compensating source may be placed anywhere between the ion projection station and the point of stripping it appears to be most practical to place the source downstream of the development station in order to derive the advantage of the lowered imbalance across the sheet, attributable to the development step. Also, it should be apparent that numerous variations in the configuration and placement of the charge compensating source as possible. For example, although the illustrated configuration of the charge compensating source, in each case, is a glass coated wire, it should be understood that any suitable source of ions, of the appropriate sign, would be acceptable. It is only necessary to provide an adequate supply of ions of a sign opposite to that of the imaging ions and to uniformly deliver them directly to the rear surface of the image receptor sheet. Of course, this also comprehends supplying ions of both polarities and allowing the system to utilize those which are needed.

It should be understood that the present invention has been made only by way of example and that variations in the combination and arrangement of parts may be resorted to without departing from the true spirit and scope of the invention as herein claimed.

What is claimed is:

1. An ion projection printing apparatus for printing on one side of a charge receptor sheet movable in a processing direction and comprising sequentially, in said processing direction, ion projection charging means for delivering imaging ions to said one side of said sheet, development means and fusing means, said charging means and said development means being located on said one side of said receptor sheet, and back electrode means located adjacent the opposite side of said sheet for accelerating and focussing the imaging ions, the apparatus being characterized by including charge compensating means located on said opposite side of said sheet at a position downstream of said charging means for delivering a countercharge to said opposite side of said sheet.

2. The ion projection printing apparatus as defined in claim 1 characterized in that said charge compensating means includes bipolar charge creating means.

3. The ion projection printing apparatus as defined in claim 2 characterized in that said back electrode means comprises electrically conductive support means against which the said opposite side of said receptor sheet is moved and a source of reference potential connected thereto, and said support means includes a groove therein extending transversely to said processing direction within which said bipolar charge creating means is located.

4. The ion projection printing apparatus as defined in claim 3 characterized in that said bipolar charge creating means comprises a dielectric coated wire and a source of alternating current connected to said wire.

5. The ion projection printing apparatus as defined in claim 1 characterized in that said charge compensating means is located between said ion projection charging means and said development means.

6. The ion projection printing apparatus as defined in claim 1 characterized in that said charge compensating means is located downstream of said development means.

7. The ion projection printing apparatus as defined in claim 1 wherein said receptor sheet and said back electrode means are separated at a location downstream of said development means and characterized in that said charge compensating means is located between said back electrode means and said receptor sheet at the point of separation.

* * * * *